(12) United States Patent
Mohamed et al.

(10) Patent No.: US 11,979,075 B2
(45) Date of Patent: May 7, 2024

(54) HOUSING OF AN ELECTRIC DRIVE

(71) Applicant: Robert Bosch GmbH, Stuttgart (DE)

(72) Inventors: Wael Mohamed, Vaihingen-Enz Aurich (DE); Michael Wolfgang Goerdeler, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 277 days.

(21) Appl. No.: 17/640,561

(22) PCT Filed: Jul. 28, 2020

(86) PCT No.: PCT/EP2020/071217
§ 371 (c)(1),
(2) Date: Mar. 4, 2022

(87) PCT Pub. No.: WO2021/043506
PCT Pub. Date: Mar. 11, 2021

(65) Prior Publication Data
US 2022/0345000 A1     Oct. 27, 2022

(30) Foreign Application Priority Data

Sep. 5, 2019   (DE) ................. 10 2019 213 545.5

(51) Int. Cl.
*H02K 5/20*     (2006.01)
(52) U.S. Cl.
CPC ..................... *H02K 5/20* (2013.01)
(58) Field of Classification Search
CPC .. H02K 5/20; H02K 9/00; H02K 9/19; H02K 9/193; H02K 9/197; H02K 9/20; H02K 5/00; H02K 5/04; H02K 5/203; Y02T 10/64
See application file for complete search history.

(56) References Cited

U.S. PATENT DOCUMENTS

2006/0273673 A1 * 12/2006 Yamamura ............ F16C 33/107
310/90

FOREIGN PATENT DOCUMENTS

| CN | 101951069 A |   | 1/2011 |   |
|----|-------------|---|--------|---|
| DE | 102009001387 A1 | * | 9/2010 | .............. B60L 11/14 |
| DE | 102009001387 A1 |   | 9/2010 |   |
| DE | 102015208783 A1 |   | 7/2016 |   |
| DE | 102015212442 A1 | * | 1/2017 |   |
| DE | 102015212442 A1 |   | 1/2017 |   |
| DE | 102017211317 A1 |   | 1/2019 |   |
| JP | 2019221054 A | * | 12/2019 | .............. H02K 5/18 |
| WO | 2005112228 A1 |   | 11/2005 |   |

(Continued)

OTHER PUBLICATIONS

WO-2009122283-A2, Siegfriedsen S, All pages (Year: 2009).*

(Continued)

*Primary Examiner* — Naishadh N Desai
(74) *Attorney, Agent, or Firm* — Michael Best & Friedrich LLP

(57) ABSTRACT

The invention relates to a housing (10) of an electric drive having a stator (29) and a rotor for an electric axle module of an electrically driven vehicle, comprising a cooling duct (56) through which a cooling medium flows. The cooling duct (56) is formed by a first duct geometry (16) on an inner side (13) of a sleeve-shaped extension (11) of the housing (10) and by a second duct geometry (24) configured on a casing (54) of a sleeve (28).

17 Claims, 10 Drawing Sheets

(56) References Cited

FOREIGN PATENT DOCUMENTS

| | | | | |
|---|---|---|---|---|
| WO | WO-2005112228 A1 | * | 11/2005 | ............... H02K 5/20 |
| WO | 2009122283 A2 | | 10/2009 | |
| WO | WO-2009122283 A2 | * | 10/2009 | ............... H02K 5/20 |

OTHER PUBLICATIONS

JP-2019221054-A, Yamanaka K, all pages (Year: 2019).*
DE-102009001387-A1, Herzberger A, all pages (Year: 2010).*
WO-2005112228-A1, Baehr H, all pages (Year: 2005).*
DE-102015212442-A1, Dassler C, all pages (Year: 2017).*
Translation of International Search Report for Application No. PCT/EP2020/071217 dated Oct. 26, 2020 (2 pages).

* cited by examiner

Fig. 8.1
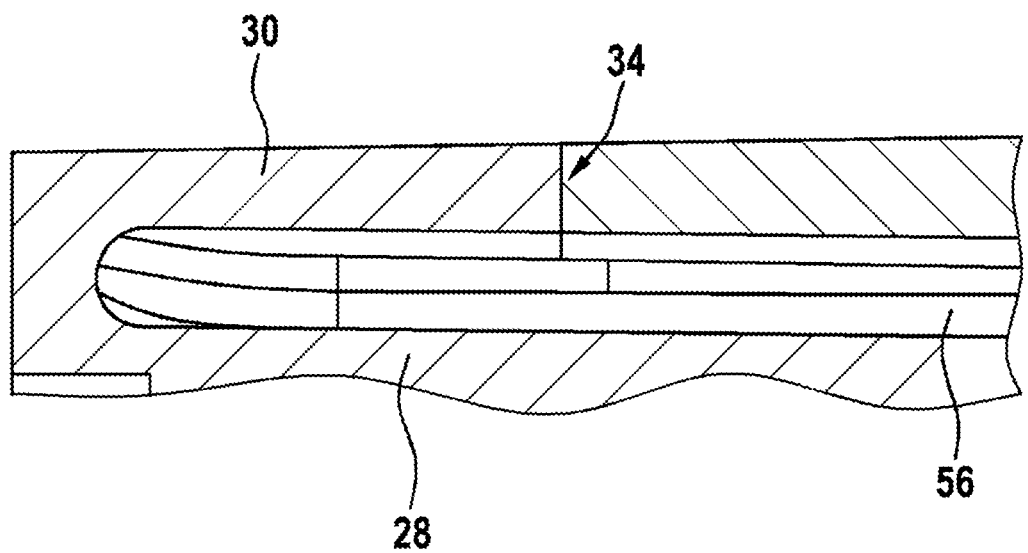
Fig. 8.2
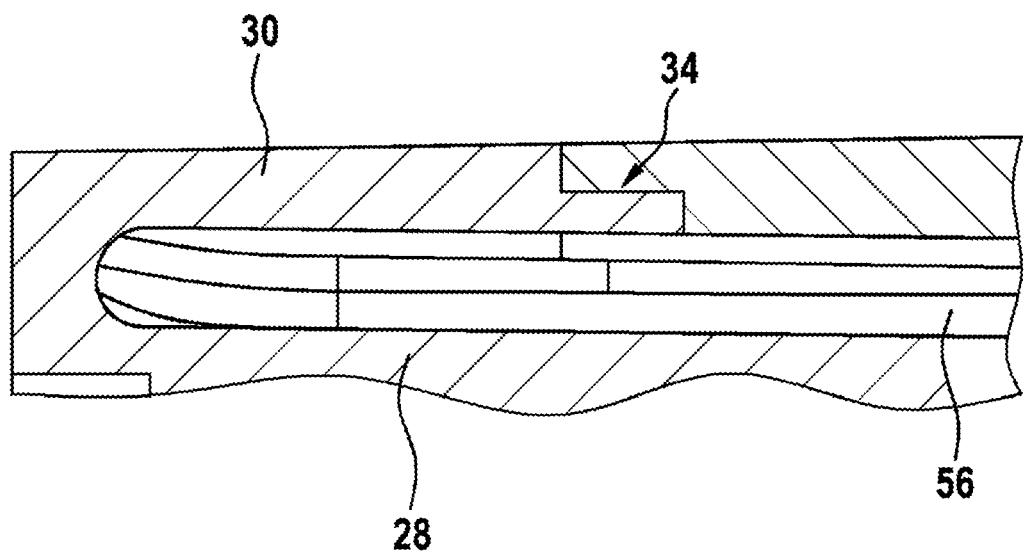

HOUSING OF AN ELECTRIC DRIVE

BACKGROUND OF THE INVENTION

The invention relates to a housing of an electric drive having at least one rotor and one stator for an e-axle module of an electrically powered vehicle, comprising a cooling channel running in the housing, through which a cooling medium flows. In addition, the invention relates to the use of the housing in an e-axle module for an electrically powered vehicle.

DE 10 2015 205 783 A1 relates to a cooling casing arrangement for receiving an electric motor, an electric drive with the cooling casing arrangement, and a method for producing the cooling casing arrangement, and/or the electric drive. Apart from the drive torque, electric motors generate waste heat due to power loss, meaning that the electric motors heat up during operation. In order to cool the electric motors, a cooling casing arrangement is therefore proposed for receiving an electric motor having an inner casing section and having an outer casing section, wherein the outer casing section has contact areas and guide areas, wherein the contact areas rest against the inner casing section and the guide areas are spaced apart from the inner casing section, so that a fluid-guiding structure for guiding a fluid is created between the inner casing section and the outer casing section. The guide areas and/or the contact areas are configured as forming areas in the outer casing area, wherein the forming areas are introduced into the outer casing section by means of a tool.

DE 10 2009 001 387 A1 relates to an electric machine. This is particularly provided for a motor vehicle and comprises a housing, a shaft with an axis, a stator and a rotor. At least one channel is provided for conducting a cooling fluid for cooling the electric machine, wherein the geometry or the orientation of at least one section of the at least one channel is designed such that the cooling fluid flows with a deflection of less than 40°, in particular exclusively in the direction of the axis of the shaft through the at least one channel.

DE 10 2015 212 442 A1 relates to a cooling casing arrangement for an electric motor and to an electric drive having the cooling casing arrangement. A cooling casing arrangement is proposed for an electric motor having a cooling casing for receiving the electric motor, wherein the cooling casing is arranged circumferentially to a main axis and the cooling casing has cooling channel areas for conducting a cooling fluid. A first deflection arrangement is arranged on a first axial side of the cooling casing, wherein the first deflection arrangement forms first deflection areas for deflecting the cooling fluid, and the first deflection arrangement has first plug-in connection sections. The first plug-in connection sections are inserted into the cooling channel areas in an axial direction to the main axis, so that the first deflection areas are fluidically connected to the cooling channel areas via the plug-in connection sections.

DE 10 2017 211 317 A1 relates to the stator of an electric machine and also to a cooling device for this. The stator of an electric machine, in particular for an electric motor drive machine for an electric or hybrid vehicle, comprises a stator core with a stator yoke and with a number of radially oriented stator teeth, and also a corresponding number of stator slots arranged between the stator teeth to receive a stator winding. A cooling device with a number of cooling channels is provided, each of which is arranged running axially in one of the stator slots.

SUMMARY OF THE INVENTION

According to the invention, a housing of an electric drive having at least one rotor and one stator for an e-axle module of an electrically powered vehicle is proposed, wherein the housing has a cooling channel running therein, through which a cooling medium flows. According to the invention, the cooling channel is, on the one hand, formed by a first channel geometry configured on an inner side of a sleeve-shaped extension and, on the other hand, by a second channel geometry configured on a casing of a sleeve.

The proposed solution according to the invention means that complex, costly and time-consuming machining of a housing for receiving a stator of an electric machine can be avoided in a manner that is particularly advantageous in terms of production. The cooling channel geometries may, on the one hand, be cast in the housing during the production thereof and, on the other hand, during production of a sleeve that can be inserted into the housing, they may be produced on the outer casing of said sleeve as a second channel geometry which is complementary to the first channel geometry, likewise using the primary forming method of casting.

As a development of the solution proposed according to the invention, the channel geometries on the inner side of the sleeve-shaped extension, on the one hand, and on the outer side of the sleeve, on the other, may be represented by ribbing, in particular by radial ribbing. In the case of the housing proposed according to the invention, the sleeve and the inner side of the sleeve-shaped extension advantageously form an extraction bevel with one another which makes assembly considerably easier. This makes it possible for the sleeve to be assembled in the axial direction in the sleeve-shaped extension of the housing.

Advantageously, the extraction bevel is such that it runs in an axial direction, starting from an A-bearing area to a B-bearing area, wherein the extraction bevel in the A-bearing area produces a smaller diameter compared with the diameter of the sleeve-shaped extension in the B-bearing area. In the case of the housing proposed according to the invention, the two channel geometries designed to be complementary to one another each have arcuate deflections, which allow the cooling medium passing through the cooling channel to be deflected. This in turn advantageously favors dissipation of the waste heat occurring during operation of an electric machine.

In the case of the housing proposed according to the invention, the cooling channel created from the first channel geometry and the second channel geometry is designed with a substantially meandering shape. The meandering shape advantageously provides a substantial lengthening for the cooling fluid flow, meaning that during its passage through all the interconnected cooling channels, it carries away the maximum amount of waste heat and effective cooling of the electric machine is guaranteed.

In the case of the housing proposed according to the invention, slots are formed in the first channel geometry, for example cast into it, into which slots radial ribbing of the second channel geometry moves when the sleeve is assembled substantially in the axial direction.

On the other hand, slots can also be made, in particular cast, in the second channel geometry, into which radial ribbing of the first channel geometry moves when the sleeve is assembled substantially in the axial direction. The slots advantageously offer a receiving area for the respective ends of the ribbing, which is particularly configured as radial ribbing, so that when the sleeve is assembled in the sleeve-shaped extension of the housing, sealing points are formed, and by introducing the heads of the ribbing into the corresponding slots, short-circuit waves for the cooling medium flow are effectively prevented and the cooling fluid flow is forced to pass via the cooling channel.

In the case of the housing proposed according to the invention, the slots which are formed on the inner side of the sleeve-shaped extension, on the one hand, and on the casing of the sleeve, on the other, run substantially in the axial direction.

In the case of the housing proposed according to the invention, the sleeve is sealed on the sleeve-shaped extension in the B-bearing area with an axial seal and a radial seal, and in the A-bearing area with at least one radial seal.

The invention further relates to the use of the housing in a transmission on an electric drive of an e-axle module for an electrically powered vehicle.

The solution proposed according to the invention makes it possible to avoid complex machining of cooling channels in a housing for receiving an electric drive in a manner that is advantageous in terms of production. Instead, the solution proposed according to the invention allows channel geometries to be formed both on the inner side of a housing and on a lateral surface of a component to be joined to the housing, in particular a sleeve, by the primary forming method of casting. These define the specific course of a cooling channel, and therefore the flow of cooling medium through the housing, or the housing part. By specifying the course of the cooling channel, the transportation of waste heat from the electrical machine can be set in a defined manner.

When producing channel geometries, radial ribbing, in particular, can be produced in a particularly simple and cost-effective manner in terms of production technology, which on the one hand allows easy demolding and, on the other hand, forms a cooling channel structure which has very good sealing properties. If, for example, slots are cast in the channel geometries, with which heads or radii of radial ribbing designed to be complementary thereto, can engage, without further sealing elements being necessary, the individual cooling channels can be sealed in respect of one another by forming a corresponding wall. In this way, short circuits in the cooling medium flow can be advantageously avoided, so that effective cooling is guaranteed and, in particular, a continuous flow of cooling medium can be guaranteed. In the case of the solution proposed according to the invention, for example, the inlet and outlet may be formed on a sleeve to be inserted into the housing. In order to facilitate assembly, both the inner side of the housing on which the first channel geometry of the cooling channel is formed, and the lateral surface of the sleeve to be joined in the housing in an axial direction with the second channel geometry have an extraction bevel. This makes assembly, which substantially takes place in an axial direction, considerably easier, so that further machining steps are not required.

The fact that the stator is pressed into the common housing means that residual stresses arise due to the overlap. These have an effect on the dimensional and positional tolerances on the common housing. The solution of the common housing proposed according to the invention makes it possible for the cooling channel to be sealed both in the radial and in the axial direction. In the case of the axial seal, a slot of an O-ring is cast on the front side of the respective housing halves. Depending on the distortion of the common housing, there may be multiple sealing variants adapted to the resulting dimensional and positional tolerances.

BRIEF DESCRIPTION OF THE DRAWINGS

The invention is described in greater detail below with reference to the drawings.

In the drawings.

DETAILED DESCRIPTION

In the following description of embodiments of the invention, identical or similar elements are denoted using the same reference signs, wherein a repeated description of these elements is dispensed with in individual cases. The figures only represent the subject matter of the invention schematically.

Figure 1:
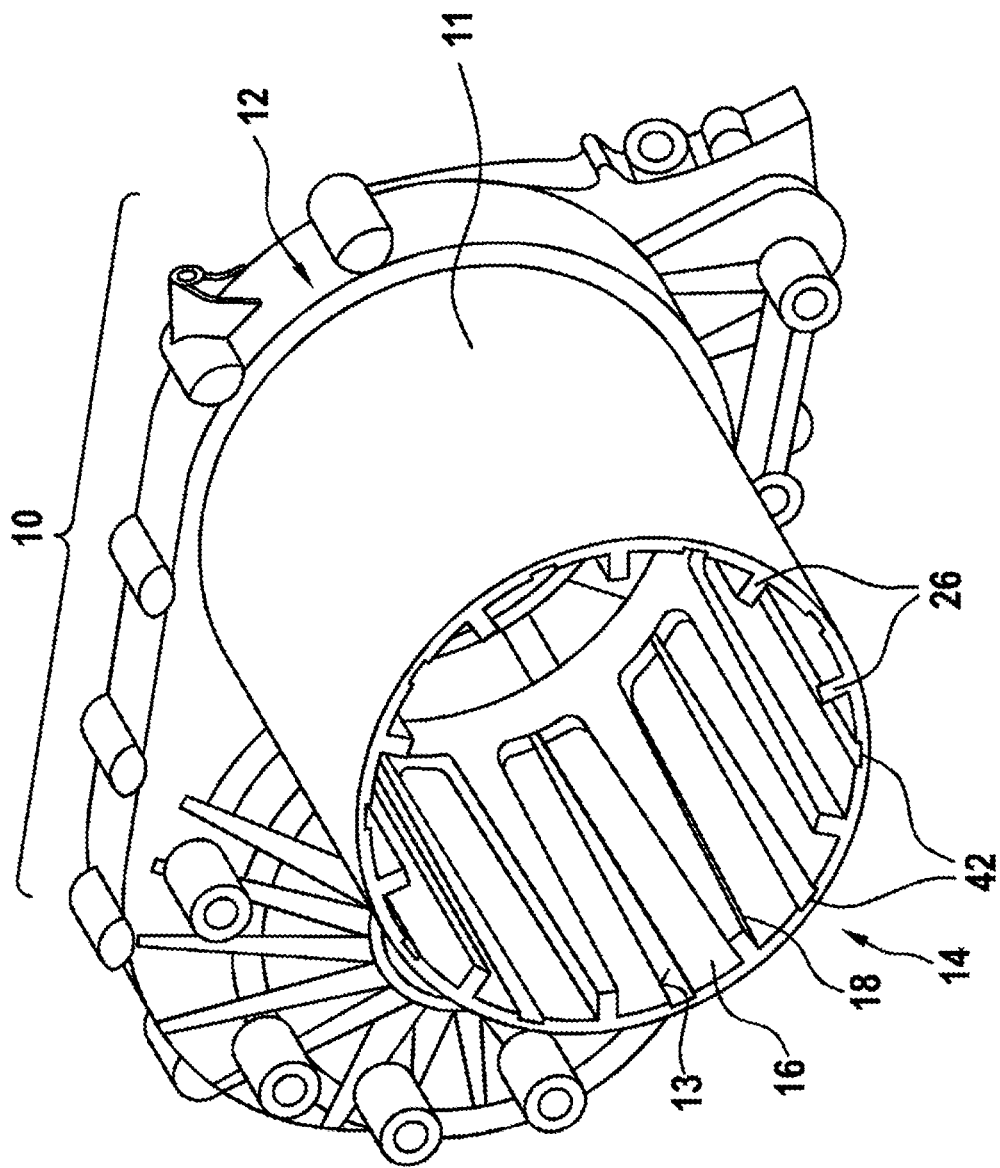
FIG. 1 shows a perspective view of a housing with a first channel geometry formed on the inner side thereof.
Figure 4:
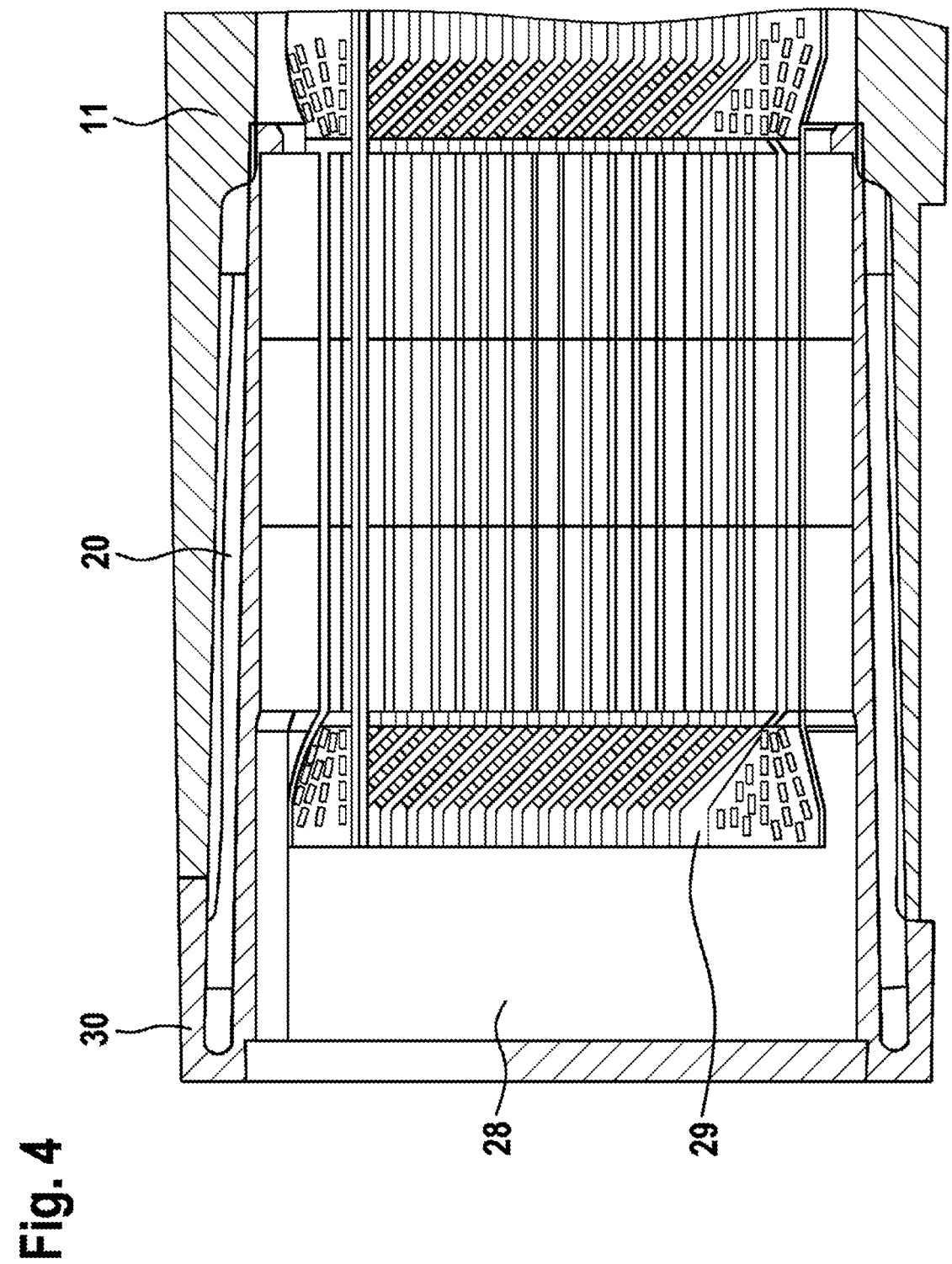
FIG. 4 shows the representation of an extraction bevel between the sleeve-shaped extension according to FIG. 1 and the sleeve according to FIG. 3.

The representation according to FIG. 1 shows a perspective view of a housing 10, on which a cylindrical, sleeve-shaped extension 11 is provided. An A-bearing area 12 is located within the sleeve-shaped extension 11; a B-bearing area 14 is provided at the open end of the sleeve-shaped extension 11. A stator 29 depicted in FIG. 4 is rotatably mounted in the A-bearing area 12 and in the B-bearing area 14, which stator has been omitted from FIG. 1 for improved clarity. An inner side 13 of the sleeve-shaped extension 11 is provided with a first channel geometry 16. The first channel geometry 16 according to FIG. 1 is such that it has individual radial ribs 26 running inwards, between which a slot 42 extending substantially in the axial direction in relation to the sleeve-shaped extension 11 is cast. The sleeve-shaped extension 11 is preferably produced as a cast part, in order to avoid complex and expensive processing of the inner side 13 of the sleeve-shaped extension 11 by means of machining processes, and instead to produce the first channel geometry 16 on the inner side 13 of the sleeve-shaped extension 11 by means of a primary forming method, such as casting, for example.

Figure 2:
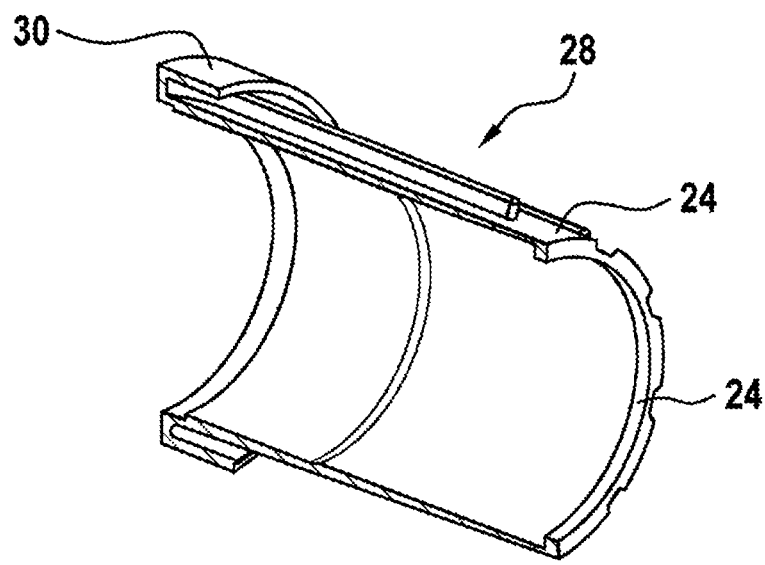
FIG. 2 shows a longitudinal section of a sleeve that can be inserted into the housing according to FIG. 1 in an axial direction.

It can be seen from the representation according to FIG. 1 that within the framework of the first channel geometry 16 on the inner side 13 of the sleeve-shaped extension 11, individual cooling channel sections, through which a cooling medium flows, are separated from one another by the radial ribbing 26. At the end of the radial ribbing 26 in each case is located an arcuate deflection 18. Between the individual radial ribbings 26 extending radially inwards on the inner side 13 of the sleeve-shaped extension 11 are located slots 42 which extend substantially in the axial direction and which are preferably cast into the inner side 13 of the sleeve-shaped extension 11. FIG. 2 shows a longitudinal section through a sleeve 28 which is provided with a second channel geometry 24 on its casing 54. A circumferential ring 30 is located in the B-bearing area 14 on the sleeve 28 shown in longitudinal section in FIG. 2. The inner surface of the sleeve 28 represented in longitudinal section in FIG. 2 is substantially planar, except for a step in diameter.

Figure 3:
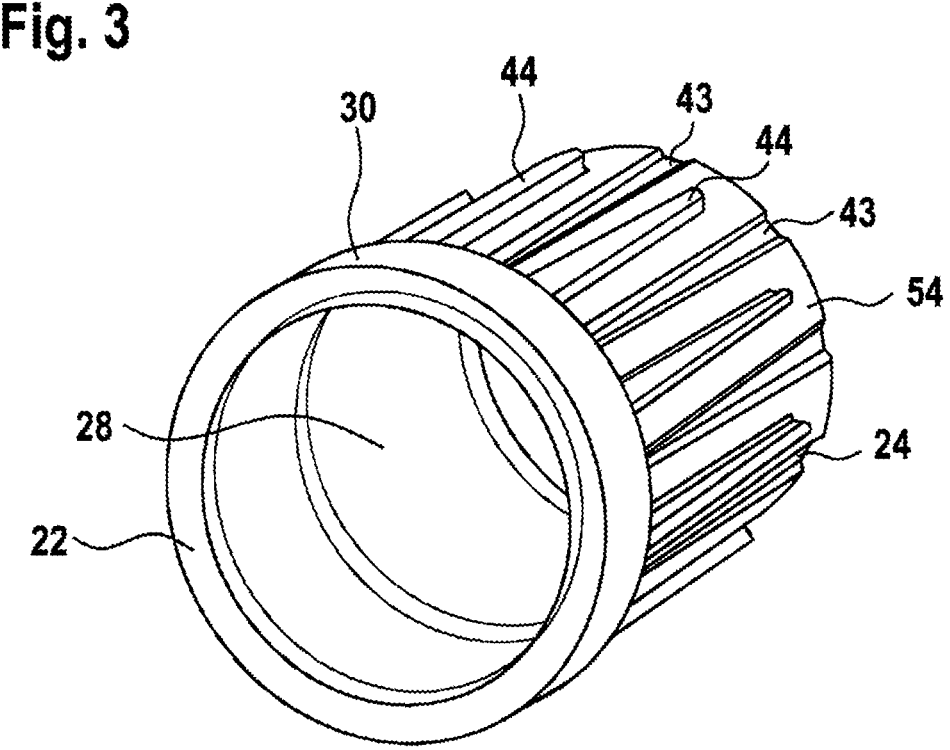
FIG. 3 shows a perspective view of the sleeve with a second channel geometry formed on the casing.

FIG. 3 shows the sleeve 28 in a perspective view, uncut. It can be seen from the perspective view according to FIG. 3 that the sleeve 28 is provided with the second channel geometry 24 on its casing 54. The second channel geometry 24 is designed to match the first channel geometry 16, as represented in FIG. 1. If the sleeve 28 is inserted into the inside of the sleeve-shaped extension 11, as represented in FIG. 3, a cooling channel 56 is formed between the first channel geometry 16 on the inner side 13 of the sleeve-shaped extension 11, on the one hand, and the second channel geometry 24 on the casing 54 of the sleeve 28, on the other hand. It can be seen from FIG. 3 that slots 43, which are preferably cast into the lateral surface 54, are likewise provided between the individual segments of the second channel geometry 24. Similarly to the radial ribbing 26 of the first channel geometry 16, the second channel geometry 24 also exhibits radial ribbing 44 on the casing 54 of the sleeve 28. As will be described later, when the sleeve 28 is installed in the axial direction in the sleeve-shaped extension 11, the radial ribbing 44 of the second channel geometry 24 is inserted into the slots 42 of the first channel geometry 16 on the inner side 13; in addition, the radial ribbing 26 formed on the inner side 13 of the sleeve-shaped extension 11 is inserted into the slots 43 in the second channel geometry 24, so that when the sleeve 28 is installed in the sleeve-shaped extension 11, the cooling channel 56 is created as a cooling channel insert 22.

FIG. 4 shows a longitudinal section through the sleeve-shaped extension 11, into which the sleeve 28 is inserted. As can be seen from the section in accordance with FIG. 4, an extraction bevel or draft 20 is provided between the sleeve-shaped extension 11 and the sleeve 28, which allows an axial assembly or dismantling of the sleeve 28. The sleeve 28 has the ring 30 at the open end; the sleeve 28 also encloses a stator 29 of an electric machine which is not shown in greater detail here. The extraction bevel or draft 20 is defined in that it has a smaller diameter in the A-bearing area 12, compared with the diameter which the sleeve 28 adopts in the B-bearing area 14. The difference in diameter produces the substantially conical extraction bevel or draft 20.

Figure 5:
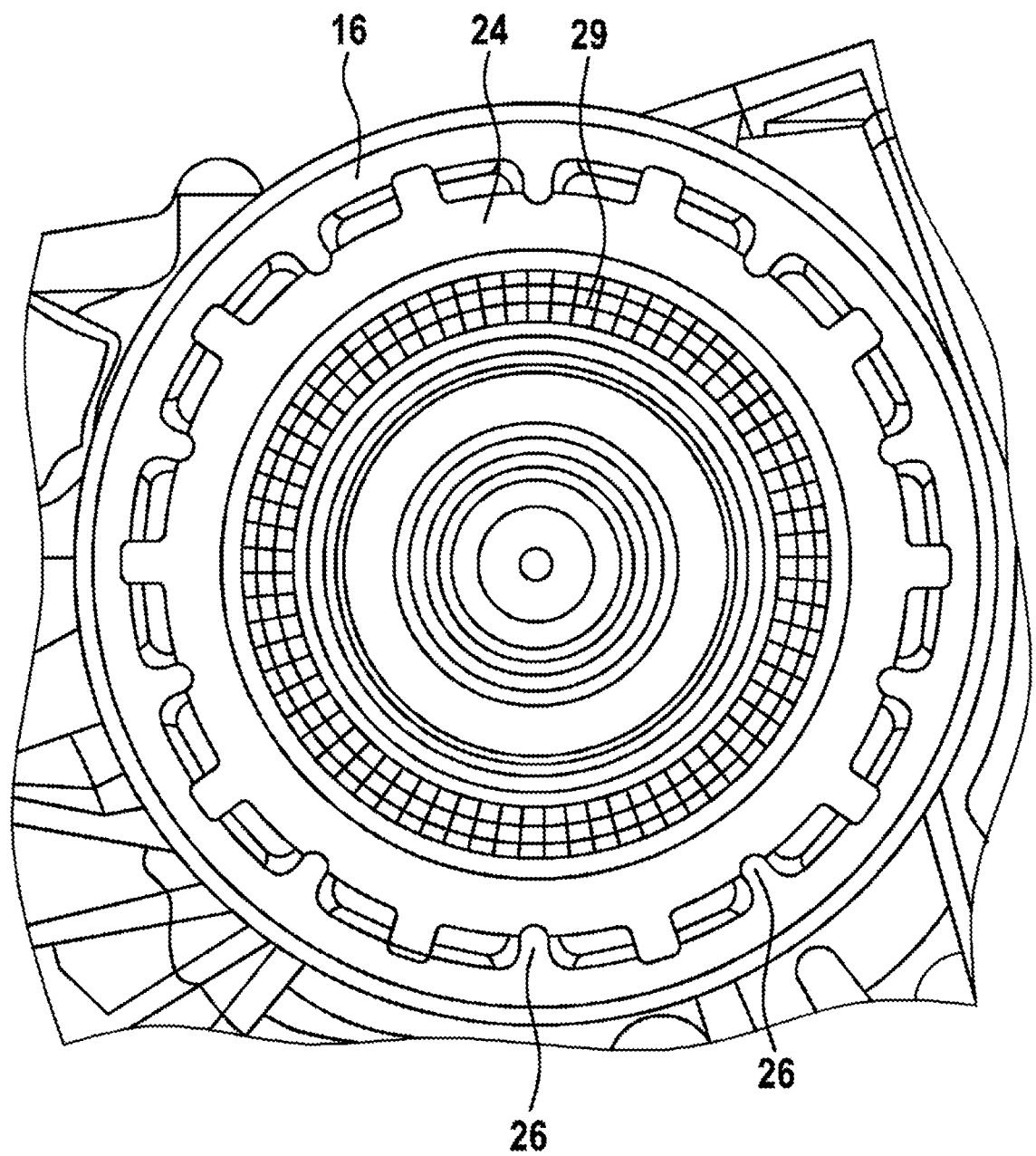
FIG. 5 shows a section through a joined arrangement of a sleeve-shaped extension and a sleeve joined therein.

FIG. 5 shows a plan view of the sleeve-shaped extension 11, the first channel geometry 16 provided on the inner side 13 thereof, a sleeve 28 inserted into the sleeve-shaped extension 11 according to FIG. 3, and the stator 29 of the electric machine.

Figure 6:
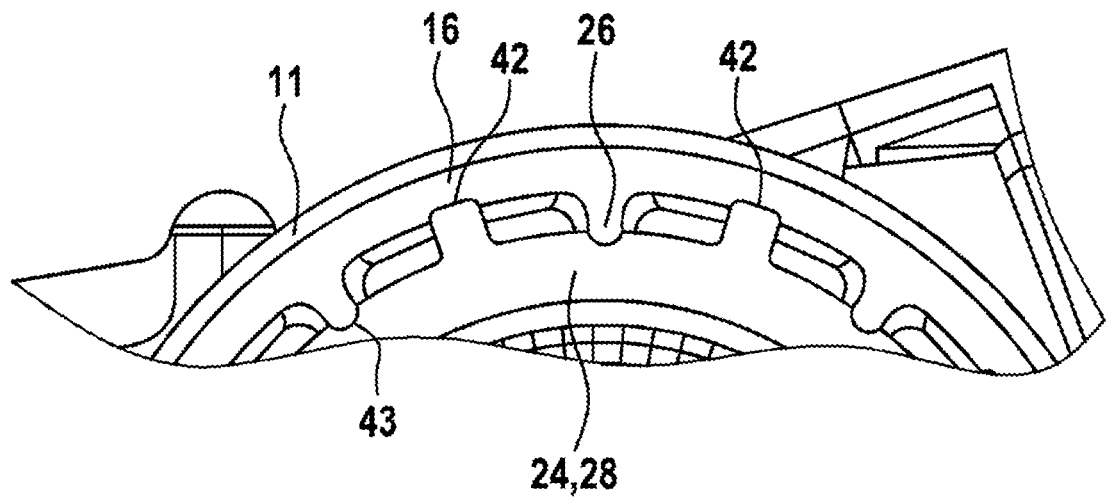
FIG. 6 shows a representation of the first and second channel geometries joined together.

FIG. 6 shows that the sleeve 28 with the second channel geometry 24 has been inserted into the first channel geometry 16 on the inner side 13 of the sleeve-shaped extension 11. As shown in FIG. 6, when the sleeve 28 is in the installed state, the radial ribbing 44 thereof is inserted into the corresponding slots 42 of the first channel geometry 16. The same applies to the radial ribbing 26 on the inner side of the first channel geometry 16.

Figure 7:
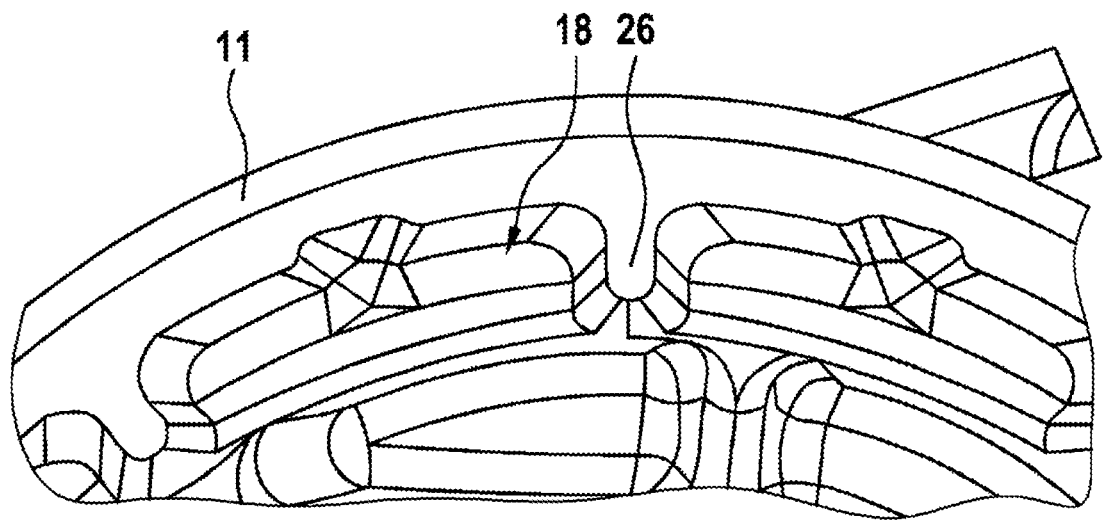
FIG. 7 shows a representation of deflections formed in the sleeve-shaped extension as part of the first channel geometry.

A detail of the first channel geometry 16 can be inferred from FIG. 7, such that individual cooling channel sections are formed by the radial ribbing 26, which sections are each limited by a deflection 18 in the A-bearing area 12. The deflection 18 in each case redirects the cooling medium flow back to the opposite side.

Figure 8:
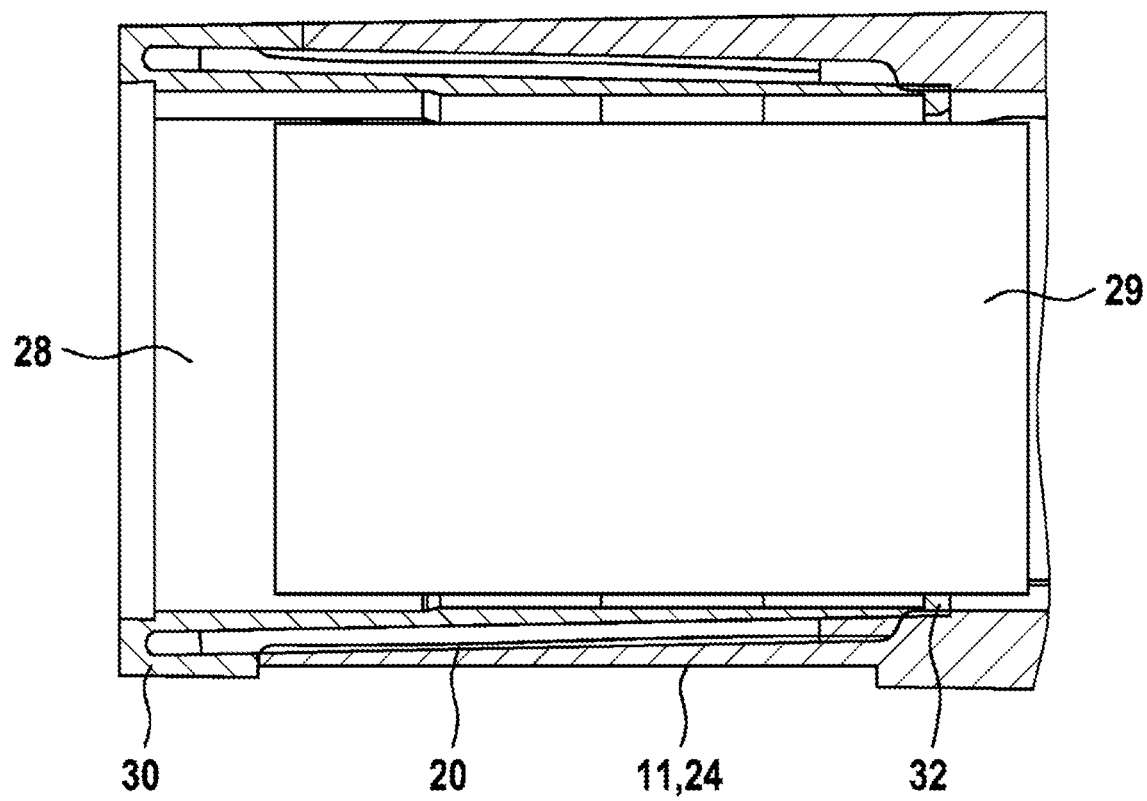
FIG. 8 shows the representation of a seal on the A-bearing side, FIGS. 8.1 and 8.2 show axial seals and a radial seal in the B-bearing area.

FIGS. 8, 8.1, and 8.2 show sealing points which are created when the sleeve 28 and the sleeve-shaped extension 11 are in the assembled state. FIG. 8 shows that the sleeve 28, which encloses the stator 29 schematically depicted in FIG. 8, is inserted in the sleeve-shaped extension 11 of the housing 10. The insertion operation is made easier by the extraction bevel or draft 20. The sleeve 28 comprises the ring 30 which has already been mentioned multiple times. A radial seal 32, which lies in the A-bearing area 12, seals at this point. It can be seen from FIGS. 8.1 and 8.2 that there is an axial seal 34 or a radial seal 36 in the B-bearing area 14, each represented by O-rings. In both figures, i.e. in FIGS. 8.1 and 8.2, the sleeve 28 enclosing the ring 30 is inserted into the sleeve-shaped extension 11, so that the structure of a cooling channel 56 created by the two channel geometries 16, 24 results.

Figure 9:
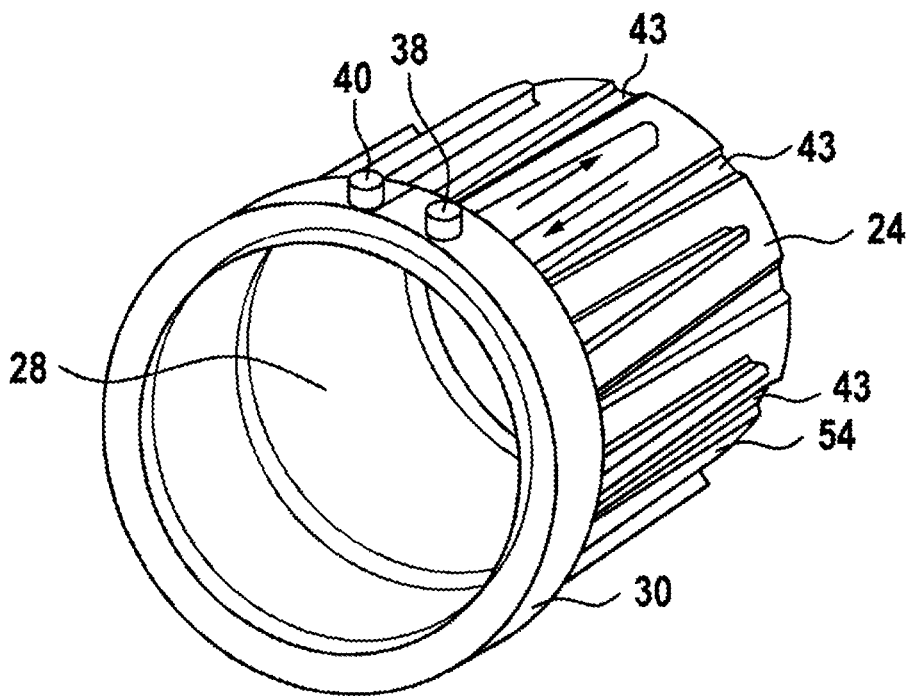
FIG. 9 shows a perspective view of the sleeve with the coolant inlet and coolant outlet.

FIG. 9 shows the sleeve 28 schematically as a perspective view. An inlet 38 for a cooling medium is located on the upper side of the ring 30; an outlet 40 is depicted adjacent thereto, at which the cooling medium leaves the cooling channel 56 in a heated state after having passed through the cooling channel 56. As FIG. 9 shows, the second channel geometry 24 is formed on the casing 54 of the sleeve 28 and, in addition to the radial ribbing 44, comprises slots 43 in the second channel geometry 24 extending in the axial direction alongside the radial ribbing 44.

Figure 10:
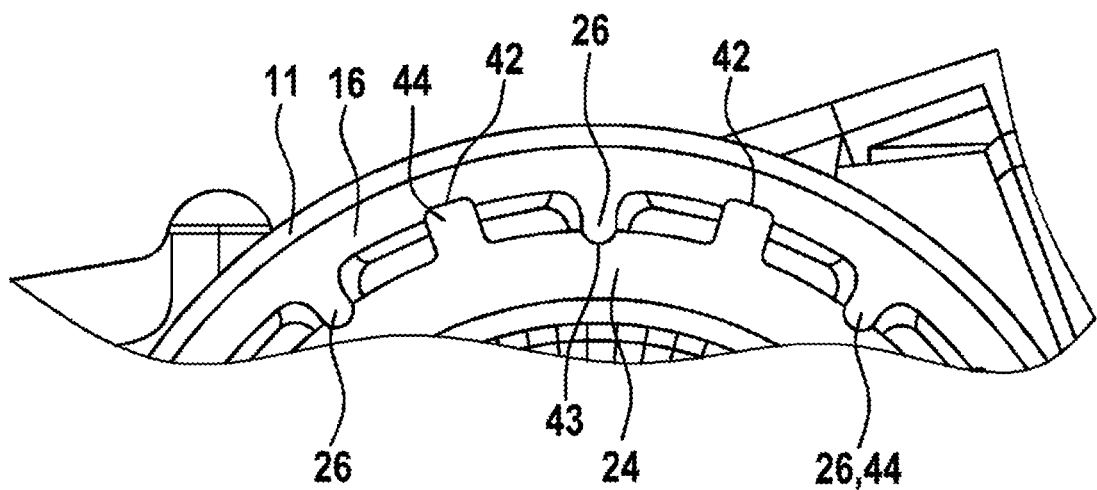
FIG. 10 shows a representation which substantially corresponds to FIG. 6, having interlocking radial ribbing or cast-in slots of the first channel geometry and the second channel geometry when the sleeve is in the assembled state.
Figure 11:
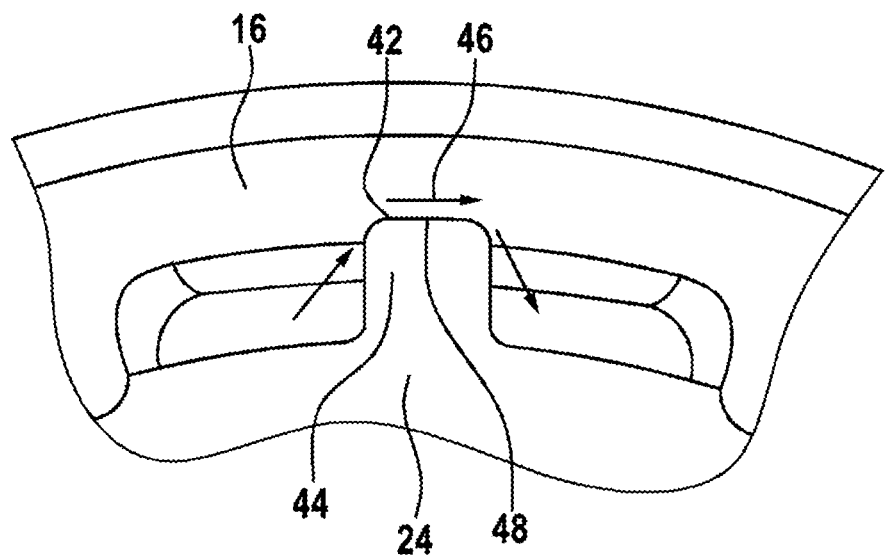
FIG. 11 shows a detailed representation of a short-circuit flow.

The representation in FIG. 10 shows that the second channel geometry 24 on the lateral surface 54 of the sleeve 28 engages with the first channel geometry 16 on the inner side 13 of the sleeve-shaped extension 11. It can be seen from the representation according to FIG. 10 that both the radial ribbing 44 of the second channel geometry 24 engages with the slots 42 of the first channel geometry 16, and the radial ribbing 26 of the first channel geometry 16 on the inner side 13 of the sleeve-shaped extension 11 engages with corresponding slots 43 of the second channel geometry 24. It is thereby guaranteed that the individual flow channel sections for the cooling fluid remain separate from one another and the short-circuit flow 46 depicted in FIG. 11 does not come about. A sealing point 48 already exists in the region of the cooling channel 56, in that—as depicted in FIG. 11—the radial ribbing 44 of the second channel geometry 24 engages with a corresponding slot 42 in the first channel geometry 16. Consequently, a short-circuit flow 46 between two channel sections of the cooling channel 56 is effectively prevented.

Figure 12:
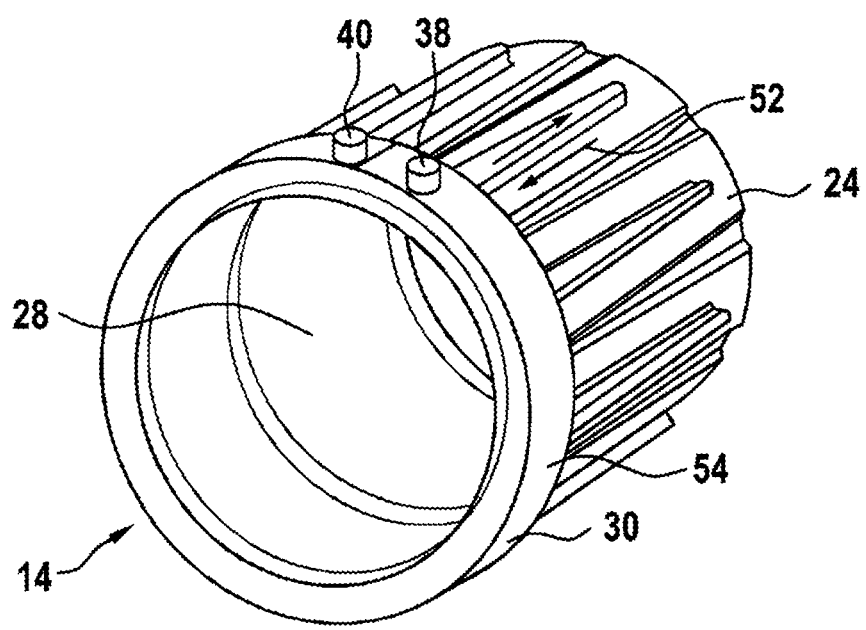
FIG. 12 shows the course of the flow path of the cooling medium based on the example of the second channel geometry on the lateral surface of the sleeve.

It can be inferred from FIG. 12 that the cooling medium flows into the cooling channel 56 via the inlet 38 and flows over from the B-bearing area 14 into the A-bearing area 12. After passing through a deflection 18 running in an arcuate manner which is not shown in FIG. 12 (cf. representation according to FIG. 1), recycled cooling medium 52 is returned from the A-bearing area 12 into the B-bearing area 14. The cooling channel 56 as a whole, i.e. when the first channel geometry 16 and the second channel geometry 24 are joined to one another, has a meandering shape 58. The formation of the meandering shape 58 between the sleeve 28 and the sleeve-shaped extension 11 creates a lengthening of the flow path for the cooling medium, so that a maximum removal of waste heat from the electric machine can be achieved by the proposed solution according to the invention.

Figure 13:
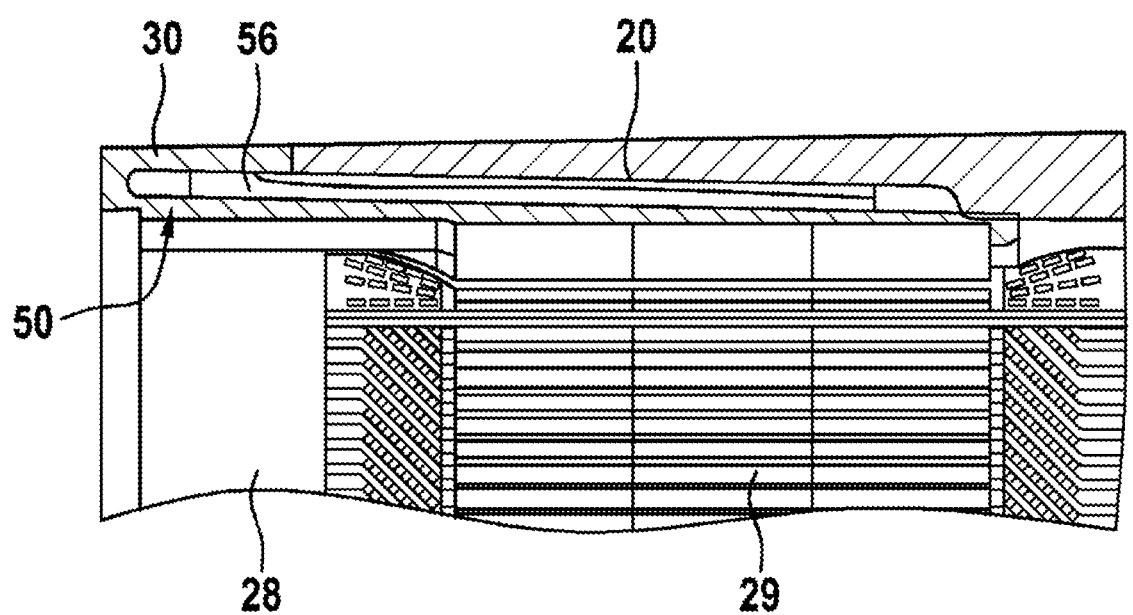
FIG. 13 shows a section through the sleeve-shaped extension with the sleeve installed therein, together with the stator of the electric machine.

FIG. 13 shows that the sleeve 28 together with the ring 30 has been inserted into the sleeve-shaped extension 11 of the housing 10 along the extraction bevel or draft 20. The conicity of the extraction bevel or draft 20 can be seen from FIG. 13. The cooling channel 56 is created by the sleeve 28 being inserted into the sleeve-shaped extension 11 with the first channel geometry 16 formed on the inner side 13. On the lateral surface 54 of said sleeve is located the second channel geometry 24 which, along with the first channel geometry 16, forms the course and the sealing of the cooling channel 56 in the housing 10.

The invention is not limited to the exemplary embodiments described here and the aspects highlighted therein. Instead, within the scope specified by the claims, a plurality of modifications which fall within the capability of the person skilled in the art is possible.

The invention claimed is:

1. A housing (10) of an electric drive having a stator (29) and a rotor for an e-axle module of an electrically powered vehicle, the housing (10) comprising a cooling channel (56) running in the housing (10), wherein a cooling medium flows in the cooling channel (56), wherein the cooling channel (56) is formed by a first channel geometry (16) configured on an inner side (13) of a sleeve-shaped extension (11) of the housing (10), and by a second channel geometry (24) configured on a casing (54) of a sleeve (28), wherein slots (42) are formed in the first channel geometry (16), and wherein radial ribbing (44) of the second channel geometry (24) moves into the slots (42) when the sleeve (28) is assembled.

2. The housing (10) as claimed in claim 1, wherein the sleeve (28) and the inner side (13) of the sleeve-shaped extension (11) have a draft (20).

3. The housing (10) as claimed in claim 2, wherein the draft (20) runs in an axial direction from an A-bearing area (12) to a B-bearing area (14).

4. The housing (10) as claimed in claim 1, wherein the first and second channel geometries (16, 24) each have arcuate deflections (18, 50) for deflecting the cooling medium.

5. The housing (10) as claimed in claim 1, wherein the cooling channel (56) composed of the first channel geometry (16) and the second channel geometry (24) runs in a meandering shape (58).

6. The housing (10) as claimed in claim 1, wherein slots (43) are formed in the second channel geometry (24), wherein radial ribbing (26) of the first channel geometry (16) moves into the slots (43) when the sleeve (28) is assembled.

7. The housing (10) as claimed in claim 1, wherein the slots (42) extend substantially in an axial direction on the inner side (13) of the sleeve-shaped extension (11).

8. The housing (10) as claimed in claim 3, wherein the sleeve (28) is sealed in the sleeve-shaped extension (11) in the B-bearing area (14) with an axial seal (34) and a radial seal (36), and in the A-bearing area (12) with at least one radial seal (32).

9. A transmission on an electric drive of an electrically powered vehicle, the transmission comprising the housing (10) as claimed in claim 1.

10. The housing (10) as claimed in claim 6, wherein the slots (43) extend substantially in an axial direction on the casing (54) of the sleeve (28).

11. The housing (10) as claimed in claim 6, wherein the sleeve (28) and the inner side (13) of the sleeve-shaped extension (11) have a draft (20).

12. The housing (10) as claimed in claim 11, wherein the draft (20) runs in an axial direction from an A-bearing area (12) to a B-bearing area (14).

13. The housing (10) as claimed in claim 12, wherein the first and second channel geometries (16, 24) each have arcuate deflections (18, 50) for deflecting the cooling medium.

14. The housing (10) as claimed in claim 13, wherein the cooling channel (56) composed of the first channel geometry (16) and the second channel geometry (24) runs in a meandering shape (58).

15. The housing (10) as claimed in claim 1, wherein the sleeve (28) is sealed in the sleeve-shaped extension (11) in a B-bearing area (14) with an axial seal (34) and a radial seal (36), and in an A-bearing area (12) with at least one radial seal (32).

16. A housing (10) of an electric drive having a stator (29) and a rotor for an e-axle module of an electrically powered vehicle, the housing (10) comprising a cooling channel (56) running in the housing (10), wherein a cooling medium flows in the cooling channel (56), wherein the cooling channel (56) is formed by a first channel geometry (16) configured on an inner side (13) of a sleeve-shaped extension (11) of the housing (10), and by a second channel geometry (24) configured on a casing (54) of a sleeve (28), wherein slots (43) are formed in the second channel geometry (24), and wherein radial ribbing (26) of the first channel geometry (16) moves into the slots (43) when the sleeve (28) is assembled.

17. The housing (10) as claimed in claim 16, wherein the slots (43) extend substantially in an axial direction on the casing (54) of the sleeve (28).

* * * * *